United States Patent
Mitsui et al.

[19]

[11] Patent Number: 5,930,218
[45] Date of Patent: Jul. 27, 1999

[54] DISK DRIVE USING DISK TRAY

[75] Inventors: Tomonori Mitsui; Mitsunori Nakamura, both of Atsugi, Japan

[73] Assignee: Mitsumi Electric Co., Ltd., Tokyo, Japan

[21] Appl. No.: 08/796,503

[22] Filed: Feb. 6, 1997

Related U.S. Application Data

[63] Continuation of application No. 08/543,909, Oct. 17, 1995, abandoned.

[30]     Foreign Application Priority Data

Oct. 24, 1994   [JP]   Japan ..................................... 6-258560

[51] Int. Cl.⁶ .......................... G11B 17/04; G11B 17/035
[52] U.S. Cl. .......................................... 369/77.1; 369/75.2
[58] Field of Search .................. 369/75.1, 75.2, 369/77.1

[56]             References Cited

U.S. PATENT DOCUMENTS 4,839,880   6/1989   D'Alayer De Costenore D'Arc et al. ............................................. 369/75.2
4,928,271   5/1990   Verhagen ................................ 369/292
4,980,883   12/1990  Mutou et al. ........................... 369/291
5,067,121   11/1991  Einhaus ................................. 369/75.2

FOREIGN PATENT DOCUMENTS 0129292   12/1984   European Pat. Off. .
6-111444   4/1994   Japan .
6-251479   9/1994   Japan .
2093253    8/1982   United Kingdom .

*Primary Examiner*—William J. Klimowicz
*Attorney, Agent, or Firm*—Ladas & Parry

[57]                ABSTRACT

A disk drive includes a disk tray for introducing a disk into a disk drive main body. The disk tray includes a disk mounting part. The disk mounting part includes a main part having a dimension compatible with the disk, extensions, and tongue parts. The extensions and the tongue parts latch a portion of the disk so as to support the disk in an upright position.

6 Claims, 18 Drawing Sheets

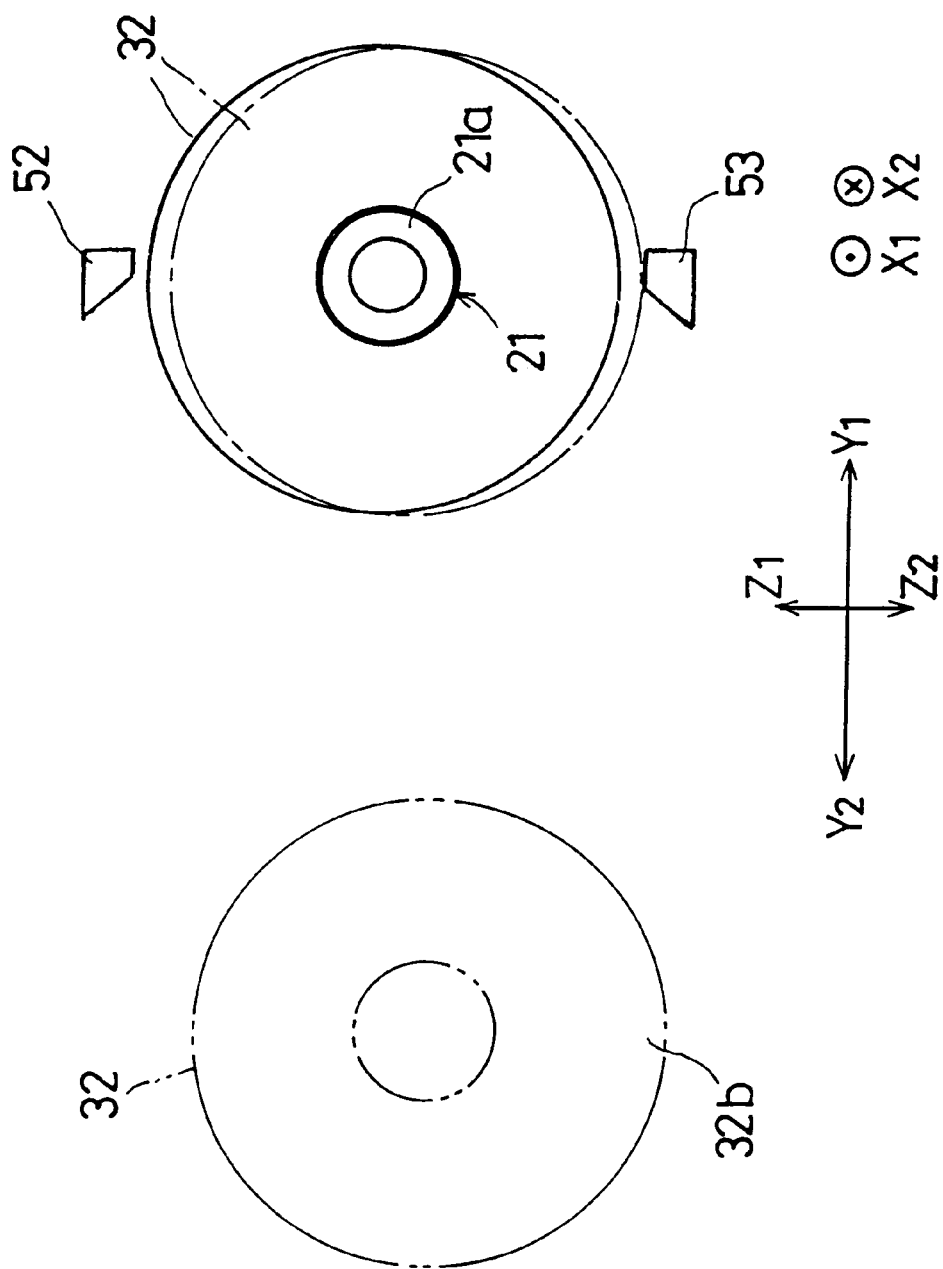

DISK DRIVE USING DISK TRAY

This is a continuation of application Ser. No. 08/543,909 filed on Oct. 17, 1995, now abandoned.

This application claims priority from Japanese patent application No. 6-258560 filed Oct. 24, 1994. Said document is incorporated herein by reference.

BACKGROUND OF THE INVENTION

1. Field of the Invention

The present invention generally relates to disk drives, and more particularly to a disk drive using disk tray and used in a computer unit.

2. Description of the Prior Art

There is known a CD-ROM drive in which a disk tray is used.

In such a CD-ROM drive, a CD-ROM mounted on a disk tray is loaded into a CD-ROM drive by pushing a loading button for translating the disk tray. Once loaded, the CD-ROM is clamped on a turntable in the CD-ROM drive and rotated by a motor. Information on the CD-ROM is reproduced by an optical head.

In most conventional computer units, a CD-ROM drive is built therein in a level position such that a disk tray lies flat.

For the purpose of reducing the size of the computer unit, some CD-ROM drives are built into a computer unit in an upright position such that a disk tray is held in a vertical position.

In conventional CD-ROM drives, a CD-ROM, if put in an upright position, slips out of a disk tray. Hence, it has been impossible to built a CD-ROM drive into a computer unit in an upright position.

SUMMARY OF THE INVENTION

Accordingly, it is an object of the present invention to provide a disk drive in which the aforementioned problem is eliminated.

Another and more specific object of the present invention is to provide a disk drive which can be built into a computer unit in an upright position as well as in a level position.

The aforementioned objects can be achieved by a disk drive comprising:
  a disk drive main body provided with a turntable and a head; and
  a disk tray provided with a disk mounting part on which a disk is mounted, and configured to be ejectable with respect to the disk drive main body, the disk tray introducing the disk mounted on the disk mounting part into the disk drive main body;
  the disk mounting part of the disk tray comprising:
    a main part having a dimension compatible with the disk, and enabling mounting of the disk in a level position when the disk drive is used in a level position;
    extensions produced by extending the main part in a direction of the width of the disk tray, and accommodating a portion of the disk mounted on the disk tray in an upright position when the disk drive is used in an upright position; and
    tongue parts extending with a vertical separation from the circumference of the extensions, like eaves hanging over the extensions, the tongue parts supporting the portion of the disk so that the disk mounted on the disk tray in an upright position is prevented from falling. The disk drive as described above can be used in a level position or in an upright position. It is to be appreciated that no additional components are necessary.

The aforementioned objects can also be achieved by a disk drive comprising:
  a disk drive main body provided with a turntable and a head; and
  a disk tray provided with a disk mounting part on which a disk is mounted, and configured to be ejectable with respect to the disk drive main body, the disk tray introducing the disk mounted on the disk mounting part into the disk drive main body;
  the disk mounting part of the disk tray comprising:
    a main part having a dimension compatible with the disk, and enabling mounting of the disk in a level position when the disk drive is used in a level position;
    extensions produced by extending the main part in a direction of the width of the disk tray, and accommodating a portion of the disk mounted on the disk tray in an upright position when the disk drive is used in an upright position; and
    tongue parts extending with a vertical separation from the circumference of the extensions, like eaves hanging over the extensions, the tongue parts supporting the portion of the disk so that the disk mounted on the disk tray in an upright position is prevented from falling;
    the disk drive main body being provided with guide parts for guiding the disk mounted on the disk mounting part in an upright position so as to draw the disk toward the main part of the disk mounting part, when the disk is introduced into the disk drive main body. In the disk drive described above, the disk mounted on the disk tray in an upright position when the disk drive is used in an upright position is centered properly so that the mounting of the disk can be effected properly. It is appreciated that no additional components are necessary in the disk drive main body.

The aforementioned objects can also be achieved by a disk drive comprising:
  a disk drive main body provided with a turntable and a head; and
  a disk tray provided with a large-diameter disk mounting part on which a large-diameter disk is mounted and a small-diameter disk mounting part on which a small-diameter disk is mounted, the large-diameter disk mounting part and the small-diameter disk mounting part being concentric, and configured to be ejectable with respect to the disk drive main body, the disk tray introducing the disk mounted on one of the disk mounting parts into the disk drive main body;
  each of the disk mounting parts of the disk tray comprising:
    a main part having a dimension compatible with the disk, and enabling mounting of the disk in a level position when the disk drive is used in a level position;
    extensions produced by extending the main part in a direction of the width of the disk tray, and accommodating a portion of the disk mounted on the disk tray in an upright position when the disk drive is used in an upright position; and
    tongue parts extending with a vertical separation from the circumference of the extensions, like eaves hanging over the extensions, the tongue parts supporting the portion of the disk so that the disk mounted on the disk tray in an upright position is prevented from falling. According to the disk drive described above, it is possible to use a selected one of a large-diameter disk and a small-diameter disk in a level position or an upright position.

The aforementioned objects can also be achieved by a disk drive comprising:

a disk drive main body provided with a turntable and a head; and a disk tray provided with a large-diameter disk mounting part on which a large-diameter disk is mounted and a small-diameter disk mounting part on which a small-diameter disk is mounted, the large-diameter disk mounting part and the small-diameter disk mounting part being concentric, and configured to be ejectable with respect to the disk drive main body, the disk tray introducing the disk mounted on one of the disk mounting parts into the disk drive main body;

each of the disk mounting parts of the disk tray comprising:

a main part having a dimension compatible with the disk, and enabling mounting of the disk in a level position when the disk drive is used in a level position;

extensions produced by extending the main part in a direction of the width of the disk tray, and accommodating a portion of the disk mounted on the disk tray in an upright position when the disk drive is used in an upright position; and tongue parts extending with a vertical separation from the circumference of the extensions, like eaves hanging over the extensions, the tongue parts supporting the portion of the disk so that the disk mounted on the disk tray in an upright position is prevented from falling;

the disk drive main body being provided with guide parts for guiding the disk mounted on one of the disk mounting parts in an upright position so as to draw the disk toward the main part of the disk mounting part, when the disk is introduced into the disk drive main body. According to the disk drive described above, it is possible to use a selected one of a large-diameter disk and a small-diameter disk in a level position or an upright position.

BRIEF DESCRIPTION OF THE DRAWINGS

Other objects and further features of the present invention will be apparent from the following detailed description when read in conjunction with the accompanying drawings, in which:

FIG. 20 shows how the disk is moved and mounted in a configuration shown in FIG. 19.

DESCRIPTION OF THE PREFERRED EMBODIMENTS

Figure 2:
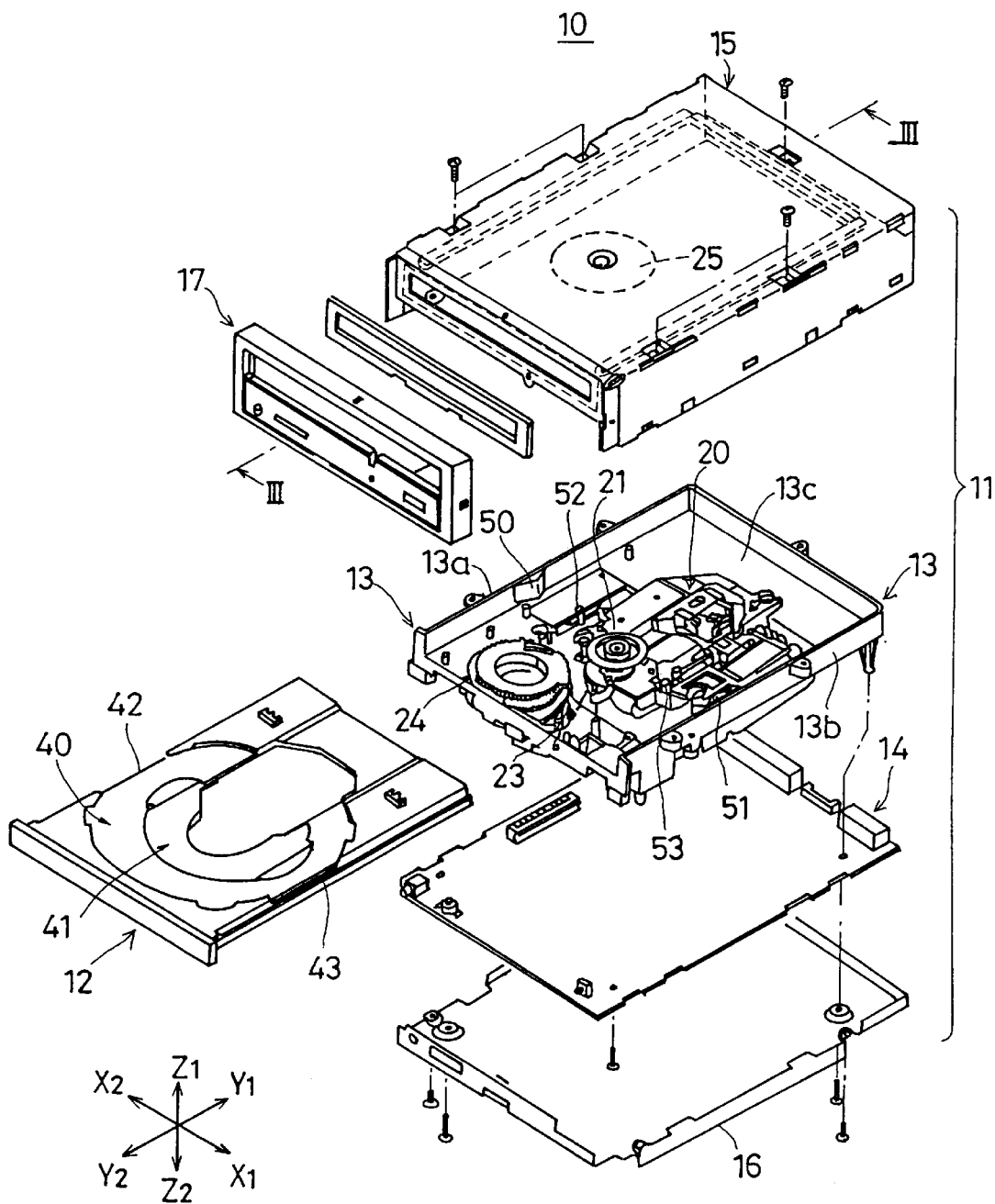
FIG. 2 is an exploded perspective view of a disk drive according to an embodiment of the present invention.
Figure 3:
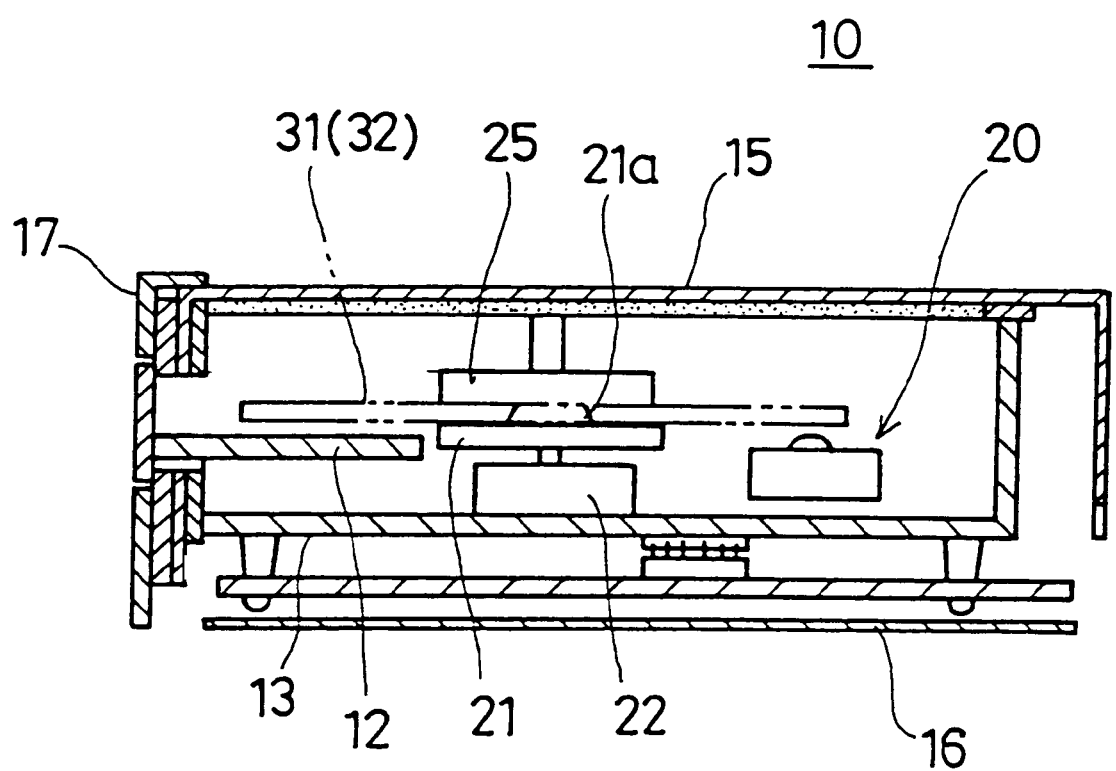
FIG. 3 is a sectional view taken in the line III—III of FIG. 2.
Figure 4:
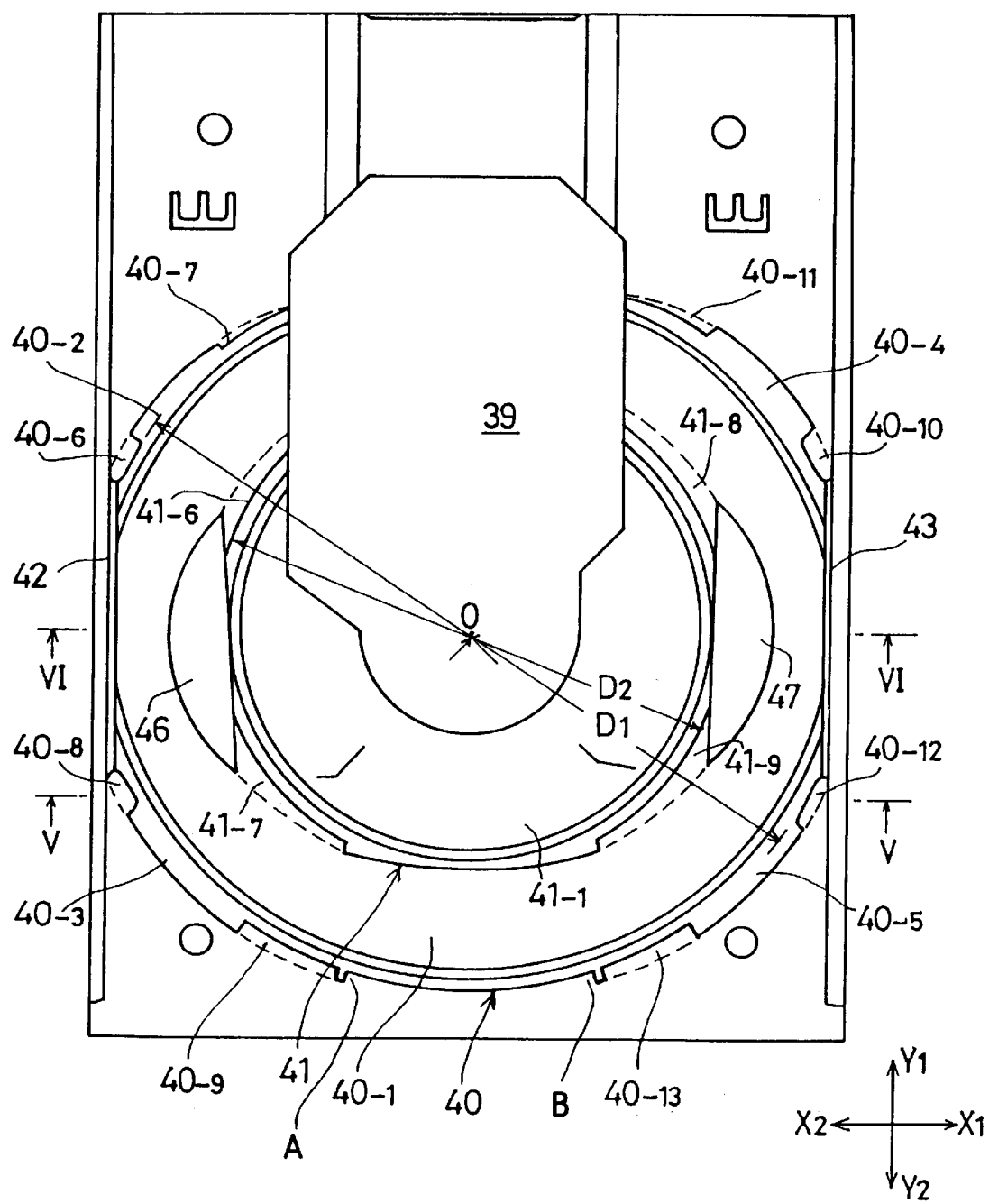
FIG. 4 is a top view of the disk tray.

FIGS. 2 and 3 show a disk drive 10 according to an embodiment of the present invention.

Figure 9:
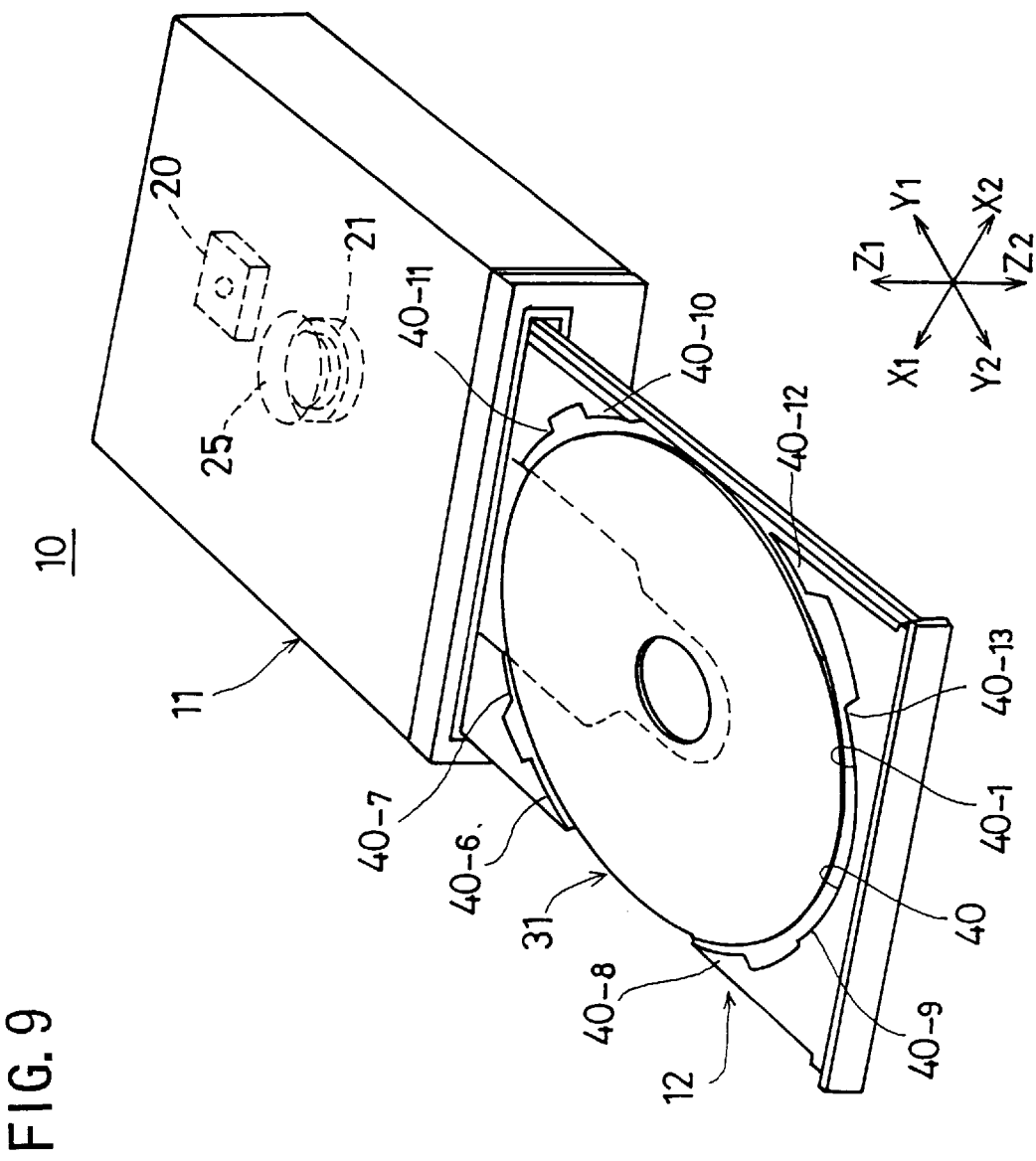
FIG. 9 shows how the disk drive shown in FIG. 2 is used in a level position and accommodates a 12-cm disk.
Figure 10:
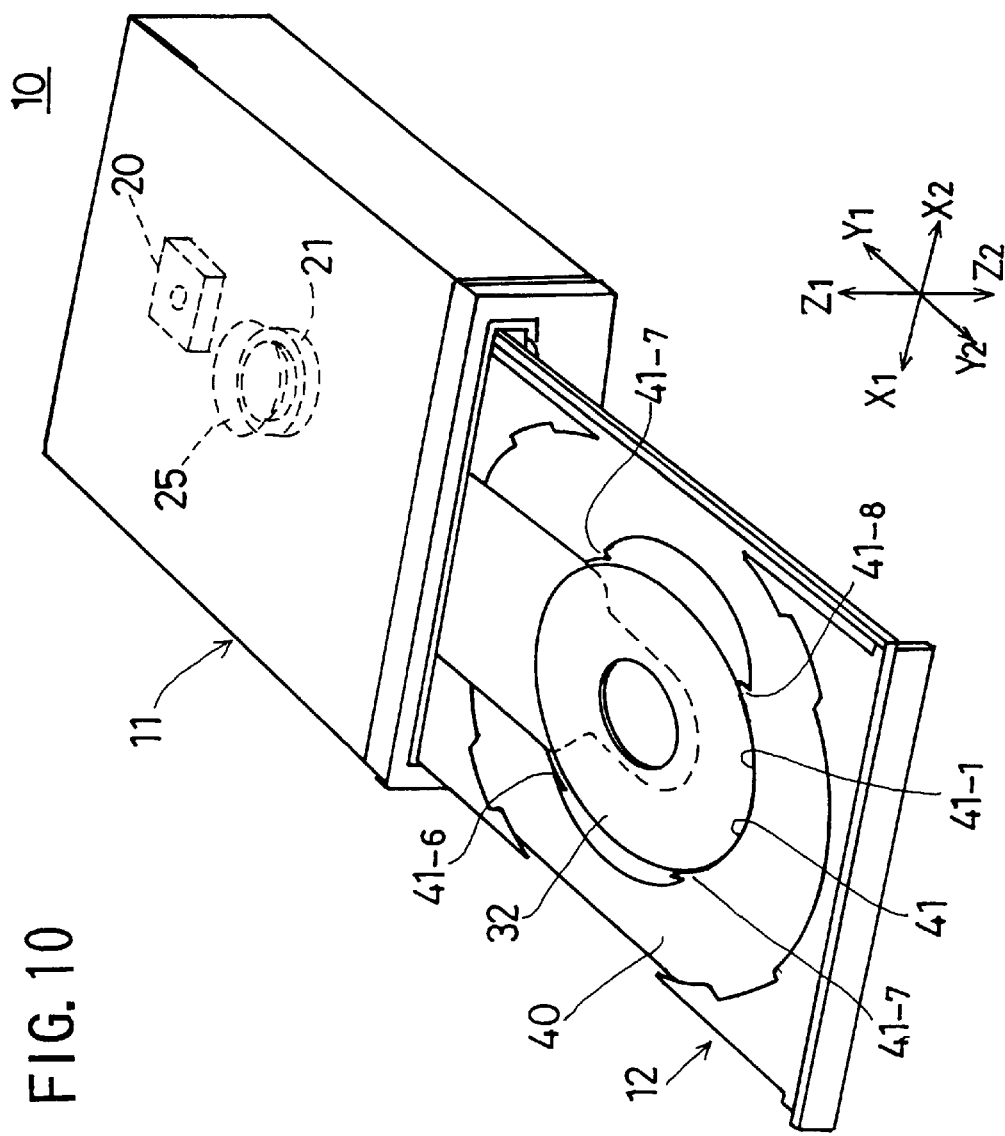
FIG. 10 shows how the disk drive shown in FIG. 2 is used in a level position and accommodates an 8-cm disk.
Figure 11:
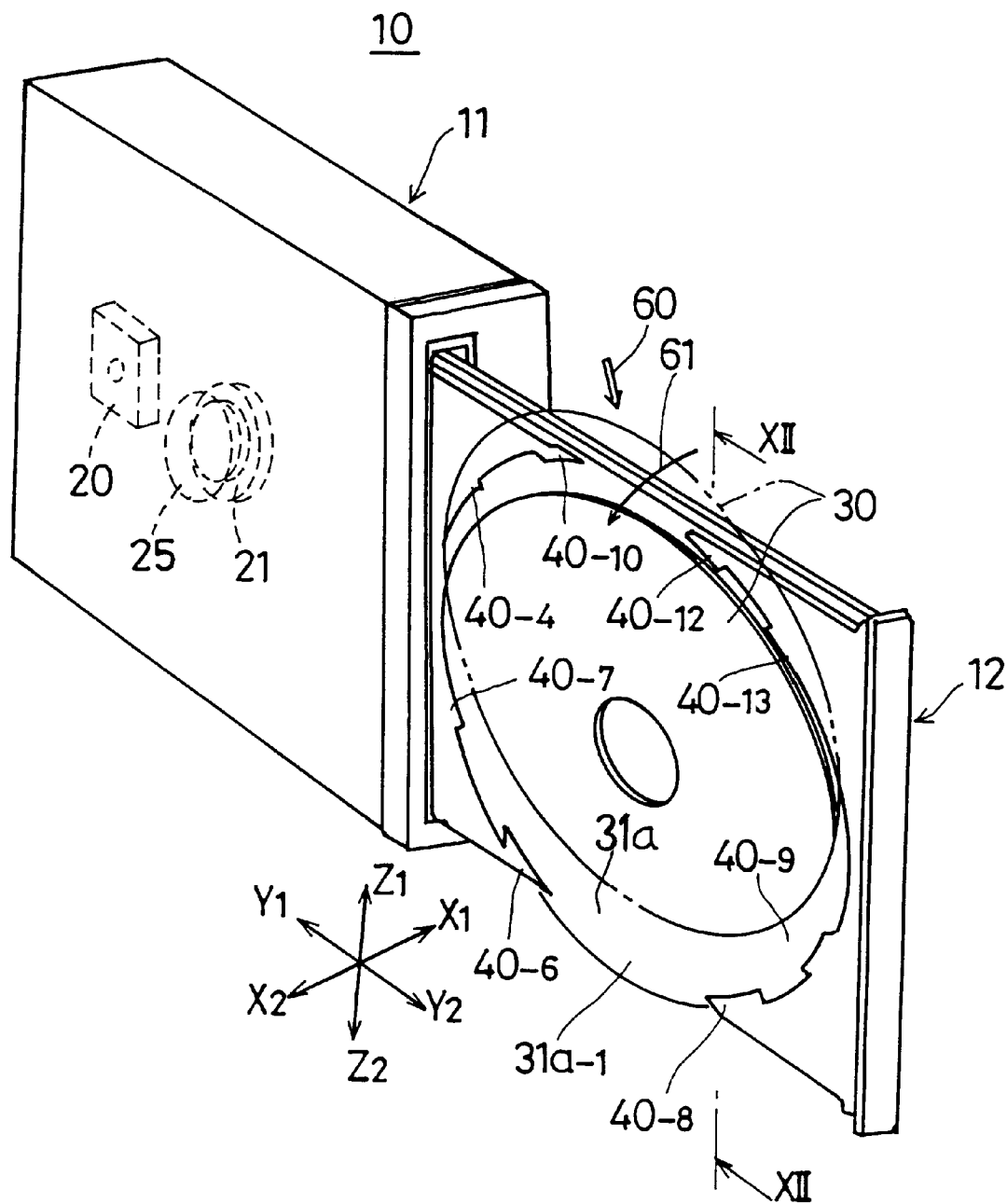
FIG. 11 shows how the disk drive shown in FIG. 2 is used in an upright position and accommodates a 12-cm disk.
Figure 14:
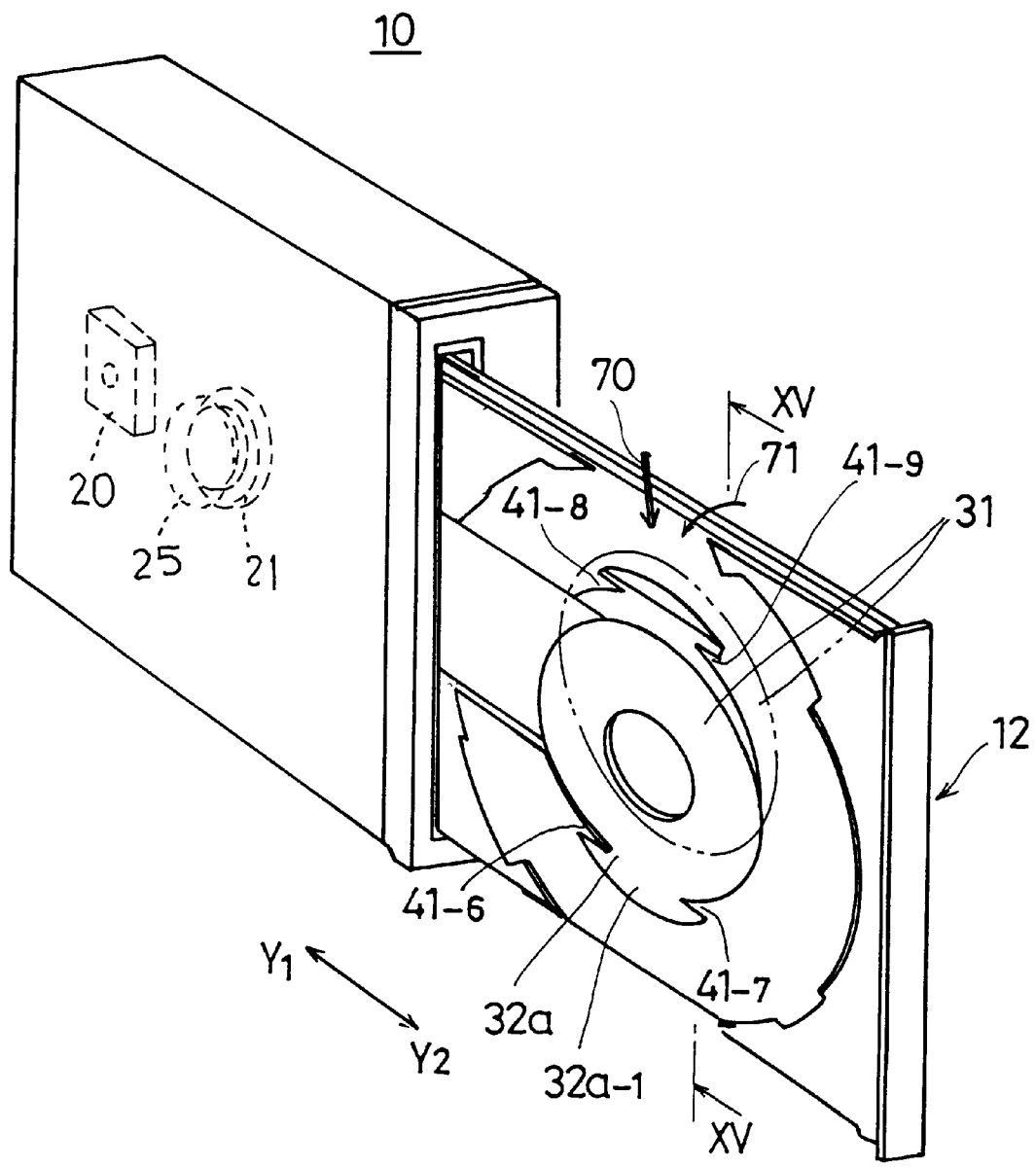
FIG. 14 shows how the disk drive shown in FIG. 2 is used in an upright position and accommodates an 8-cm disk.

FIGS. 9 and 10 show the disk drive 10 in a level position, and FIGS. 11 and 14 show the disk drive 10 in an upright position.

A description will first be given of the schematic construction and the operation of the disk drive 10.

Referring to FIGS. 2 and 3, the disk drive 10 has a disk drive main body 11 and a disk tray 12.

The disk drive main body 11 has a chassis 13, a circuit board composite 14, a case 15, a bottom plate 16 and a front bezel 17.

The chassis 13 has a shape of a rectangular container and accommodates an optical head 20, a turntable 21, a turntable motor 22, a turntable raising/lowering mechanism 23 for raising and lowering the turntable 21 in the $Z_1$ direction and the $Z_2$ direction, respectively, and a disk tray translating mechanism 24 for translating the disk tray in the $Y_1$ direction and the $Y_2$ direction.

A clamper 25 is provided inside the case 15.

A 12-cm disk 31 or an 8-cm disk 32 is mounted on the disk tray 12 and loaded into the disk drive main body 11. As shown in FIG. 3, the disk 31 (32) loaded is clamped on the turntable 21 by the damper 25 with a small separation from the disk tray 12 and rotated by the motor 22. Information on the disk 31 (32) is reproduced by the optical head 20.

A description will now be given of an important part of the present invention.

First, the disk tray 12 will be described with reference to FIGS. 1, 2, 4, 5, 6, 7 and 8.

The disk tray 12 is formed of a resin.

The disk tray 12 has a 12-cm disk mounting part 40 on which the 12-cm disk 31 is mounted, an 8-cm disk mounting part 41 on which the 8-cm disk 32 is mounted, and an opening 39 for the turntable 21 and the optical-head 20.

The disk mounting parts 40 and 41 are both shallow and flat depressions.

The disk mounting parts 40 and 41 are disposed concentrically about a point 0.

The disk mounting part 41 is a depression provided in the center of the disk mounting part 40.

The 12-cm disk mounting part 40 comprises a main part $40_{-1}$ (see FIG. 7) having a diameter $D_1$ of 12 cm, generally crescent shaped extensions $40_{-2}$–$40_{-5}$ (see FIG. 7) produced by extending the main part $40_{-1}$ in the direction of the width of the disk tray 12 (in the $X_1$ direction and the $X_2$ direction), tongue parts $40_{-6}$ and $40_{-7}$ extending with a vertical separation from the circumference of the extension $40_{-2}$, tongue parts $40_{-8}$ and $40_{-9}$ extending with a vertical separation from the circumference of the extension $40_{-3}$, tongue parts $40_{-10}$ and $40_{-11}$ extending with a vertical separation from the circumference of the extension $40_{-4}$, and tongue parts $40_{-12}$ and $40_{-13}$ extending with a vertical separation from the circumference of the extension $40_{-5}$, the tongue parts $40_{-6}$–$40_{-13}$ being like eaves hanging over the extensions $40_{-2}$–$40_{-5}$.

The tongue parts $40_{-6}$–$40_{-13}$ do not hang over the main part $40_{-1}$.

The main part $40_{-1}$ extends in the $X_1$ direction and the $X_2$ direction as far as the respective ends of the disk tray 12.

The extensions $40_{-2}$–$40_{-5}$ also extend in the $X_1$ direction and the $X_2$ direction as far as the respective ends of the disk tray 12.

Figure 1:
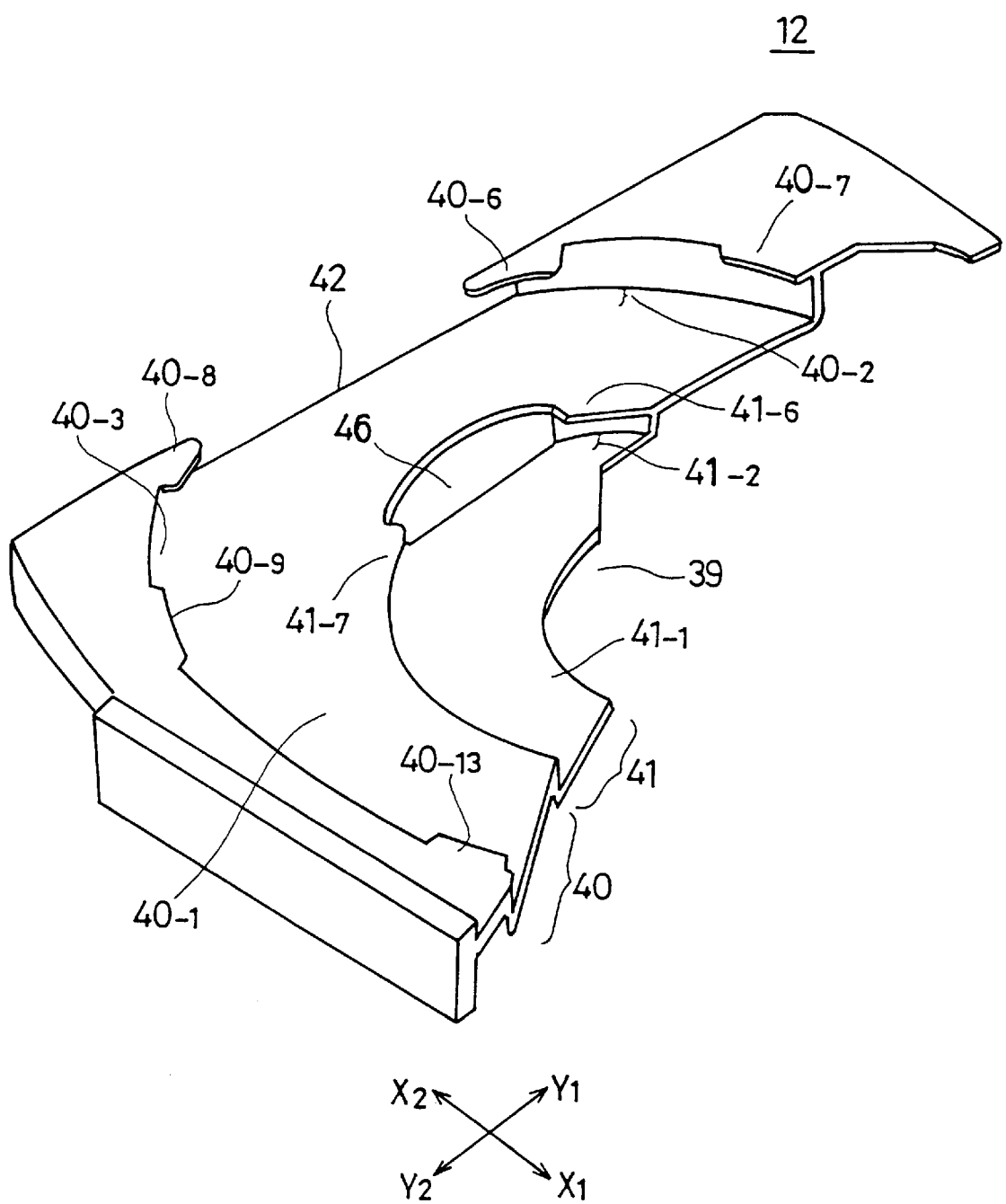
FIG. 1 is a perspective view of a disk tray with a part broken away.

As shown in FIGS. 1 and 2, the end formed by the main part $40_{-1}$ and the extensions $40_{-2}$ and $40_{-3}$ produces a notch 42 in the $X_2$ end of the disk tray 12. Similarly, the end formed by the main part $40_{-1}$ and the extensions $40_{-4}$ and $40_{-5}$ produces a notch 43 in the $X_1$ end of the disk tray 12.

The tongue parts $40_{-6}$ and $40_{-7}$ are disposed above the respective ends of the extension $40_{-2}$, the tongue parts $40_{-8}$ and $40_{-9}$ are disposed above the respective ends of the extension $40_{-3}$, the tongue parts $40_{-10}$ and $40_{-11}$ are disposed above the respective ends of the extension $40_{-4}$, and the tongue parts $40_{-12}$ and $40_{-13}$ are disposed above the respective ends of the extension $40_{-5}$.

In an alternative description, the tongue parts $40_{-6}$–$40_{-13}$ are provided with an "undercut" by hanging over the extensions $40_{-2}$–$40_{-5}$ around the main part $40_{-1}$.

Figure 5:
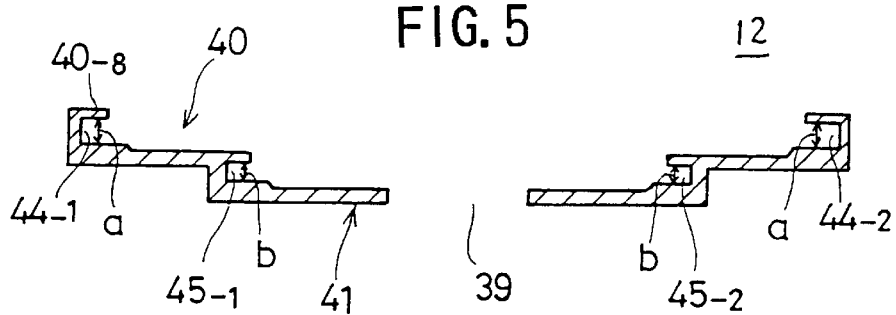
FIG. 5 is a sectional view taken in the line V—V of FIG. 4.
Figure 6:
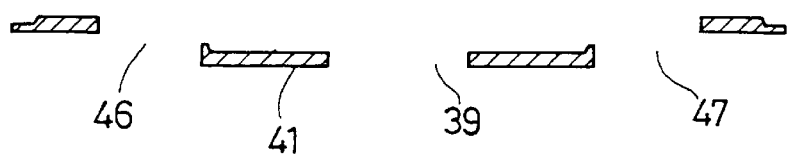
FIG. 6 is a sectional view taken in the line VI—VI of FIG. 4.
Figure 7:
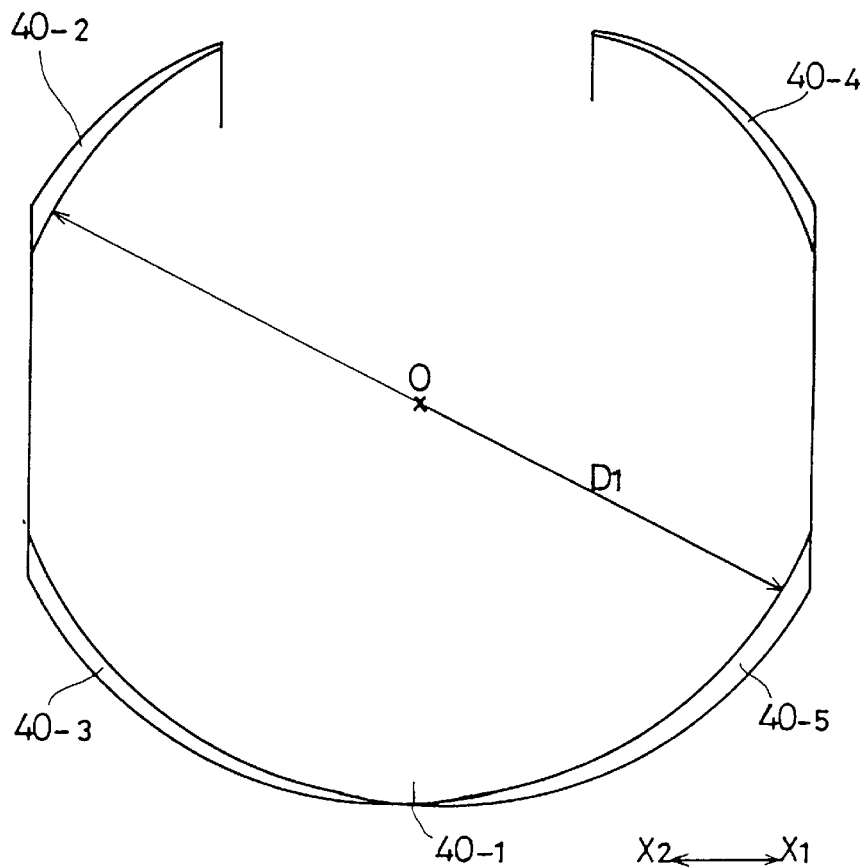
FIG. 7 shows a main part and extensions in a 12-cm disk mounting part.
Figure 8:
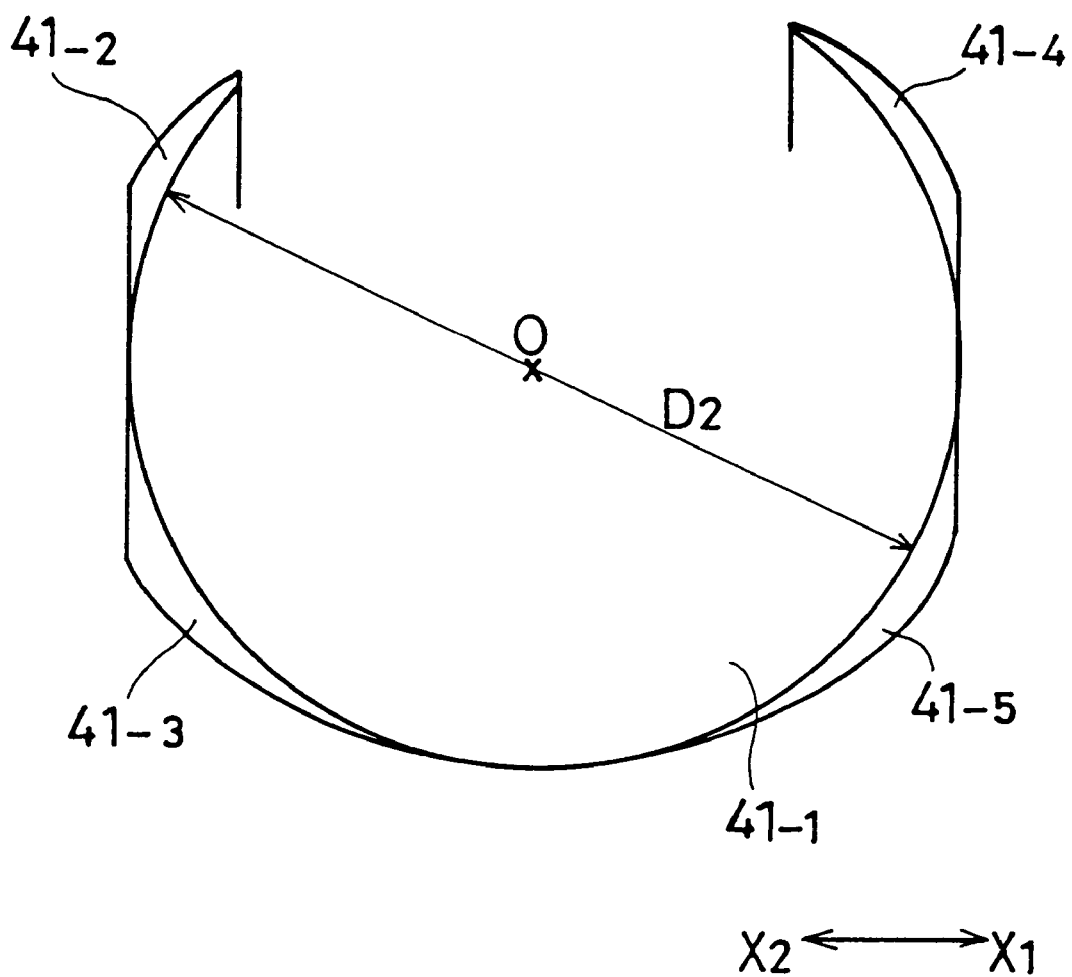
FIG. 8 shows a main part and extensions in an 8-cm disk mounting part.

As shown in FIG. 5, gaps $44_{-1}$ and $44_{-2}$ between the tongue parts $40_{-6}$–$40_{-13}$ and the extensions $40_{-2}$–$40_{-5}$ have a dimension a which is generally equal to the thickness $t_1$ (see FIG. 12) of the disk 31.

The 8-cm disk mounting part 41 has substantially the same construction as that of the 12-cm disk mounting part 40 described above.

Specifically, the 8-cm disk mounting part 41 comprises a main part $41_{-1}$ (see FIG. 8) having a diameter $D_2$ of 8 cm, generally crescent shaped extensions $41_{-2}$–$41_{-5}$ (see FIG. 8) produced by extending the main part $41_{-1}$ in the direction of the width of the disk tray 12 (in the $X_1$ direction and the $X_2$ direction), a tongue part $41_{-6}$ extending with a vertical separation from the circumference of the extension $41_{-2}$, a tongue part $41_{-7}$ extending with a vertical separation from the circumference of the extension $41_{-3}$, a tongue part $41_{-8}$ extending with a vertical separation from the circumference of the extension $41_{-4}$, and a tongue part $41_{-9}$ extending with a vertical separation from the circumference of the extension $41_{-5}$, the tongue parts $41_{-6}$–$41_{-9}$ being like eaves hanging over the extensions $41_{-2}$–$41_{-5}$.

The tongue parts $41_{-6}$–$41_{-9}$ do not hang over the main part $41_{-1}$.

In an alternative description, the tongue parts $41_{-6}$–$41_{-9}$ are provided with an "undercut" by hanging over the extensions $41_{-2}$–$41_{-5}$ around the main part $41_{-1}$.

As shown in FIG. 5, gaps $45_{-1}$ and $45_{-2}$ between the tongue parts $41_{-6}$–$41_{-13}$ and the extensions $41_{-2}$–$41_{-5}$ have a dimension b which is generally equal to the thickness $t_1$ (see FIG. 15) of the disk 32.

The disk tray 12 is also constructed such that the main part $40_{-1}$ of the 12-cm disk mounting part 40 is provided with generally semicircular shaped openings 46 and 47 (see FIG. 6) adjacent to the $X_1$ and $X_2$ ends of the 8-cm disk mounting part 41, respectively.

The tongue parts $40_{-6}$–$40_{-13}$ and $41_{-6}$–$41_{-9}$ are formed to be integral with the disk tray 12. Thus, the disk tray 12 has a one-piece structure. That is, no additional components are added.

A description will now be given of the chassis 13.

The chassis 13 is formed of a resin.

As shown in FIG. 2, the chassis 13 has rising side walls 13a and 13b provided with disk centering guide parts 50 and 51, respectively. The guide parts 50 and 51 project toward the turntable 21 and are provided opposite to the turntable 21.

The chassis 13 further includes column shaped disk centering guide parts 52 and 53 on a bottom plate 13c. The guide parts 52 and 53 are disposed opposite to the turntable 21 and face the openings 46 and 47 of the disk tray 12, respectively, when the disk tray 12 is introduced into the disk drive main body 11.

The guide parts 50–53 are formed to be integral with the chassis 13.

Thus, no additional components are added to the chassis 13 in order to make it possible for the disk drive 10 to be used in an upright position.

Figure 13:
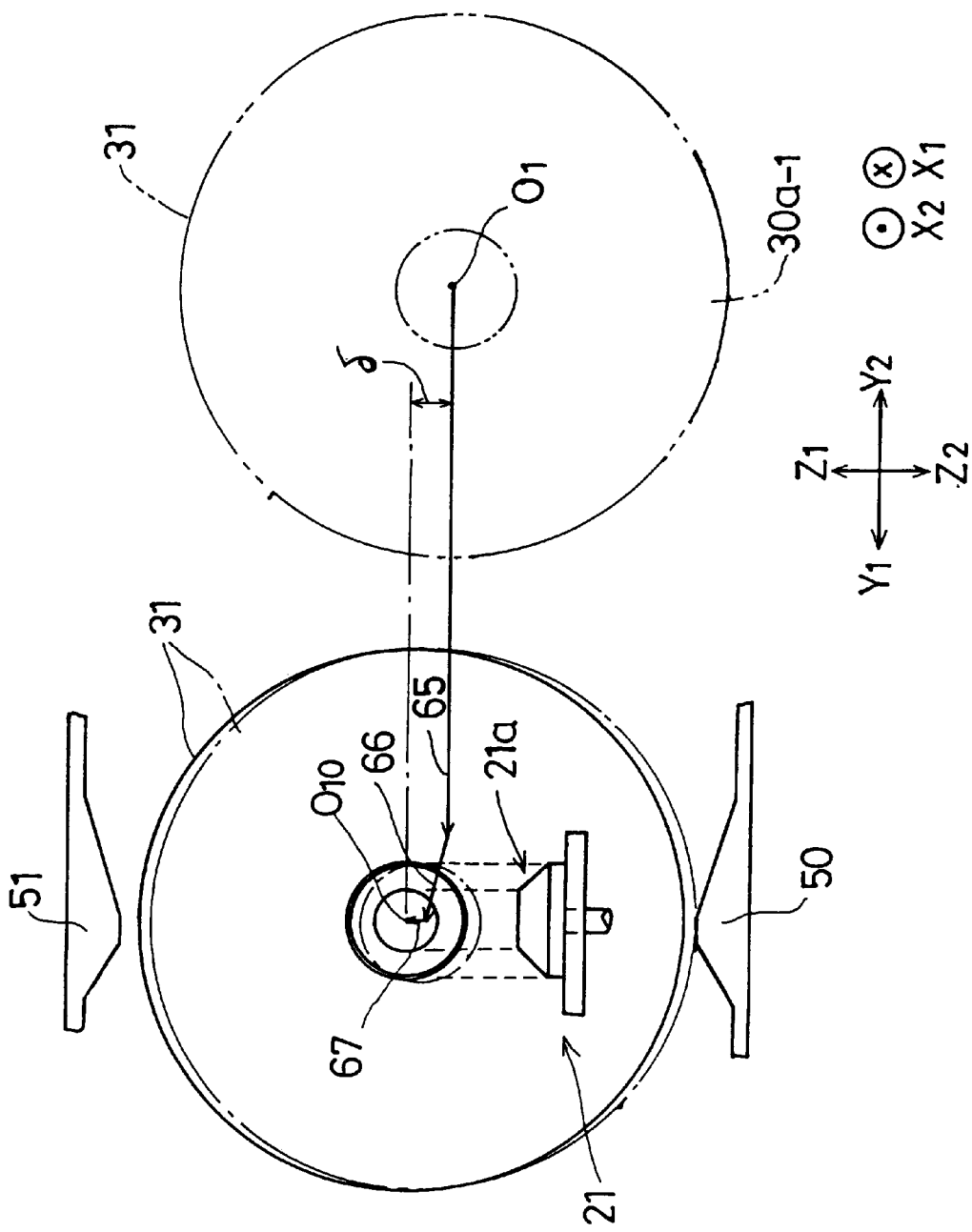
FIG. 13 shows how the disk is moved and mounted in a configuration shown in FIG. 11.

The turntable 21 has a tapered centering hub 21a at its center (see FIG. 13).

A description will now be given, especially with reference to FIGS. 9 and subsequent drawings, of the operation of the disk drive 10 having the above-described construction.

First, a description will be given of how the disk drive 10 is built into a computer in a level position (FIGS. 9 and 10).

It is assumed that the 12-cm disk 31 is used.

As shown in FIG. 9, the 12-cm disk 31 is mounted on the main part $40_{-1}$ of the 12-cm disk mounting part 40 of the disk tray 12 in a level position.

The 12-cm disk 31 is mounted on the main part $40_{-1}$ without sitting on the tongue parts $40_{-6}$–$40_{-13}$.

The 12-cm disk 31 is introduced into the disk drive main body 11 by the disk tray 12, clamped on the turntable 21 and rotated by the motor 22. Information on the disk 31 is read by the optical head 22.

That is, the operation of the disk drive 10 is the same as the operation wherein a conventional tray is used. Thus, the present invention provides ease of use. The same thing applies to the case of the 8-cm disk described below.

It is now assumed that the 8-cm disk 32 is used.

As shown in FIG. 10, the 8-cm disk 32 is mounted on the main part $41_{-1}$ of the 8-cm disk mounting part 41 of the disk tray 12 in a level position.

The 8-cm disk 32 is mounted on the main part $41_{-1}$ without sitting on the tongue parts $41_{-6}$–$41_9$.

The 8-cm disk 32 is introduced into the disk drive main body 11 by the disk tray 12 and clamped on the turntable 21, rotated by the motor 22. Information on the disk 32 is read by the optical head 20.

Second, a description will be given of how the disk drive 10 is built into a computer in an upright position.

A case where the disk mounting parts 40 and 41 face left as shown in FIG. 11 is considered.

Figure 12:
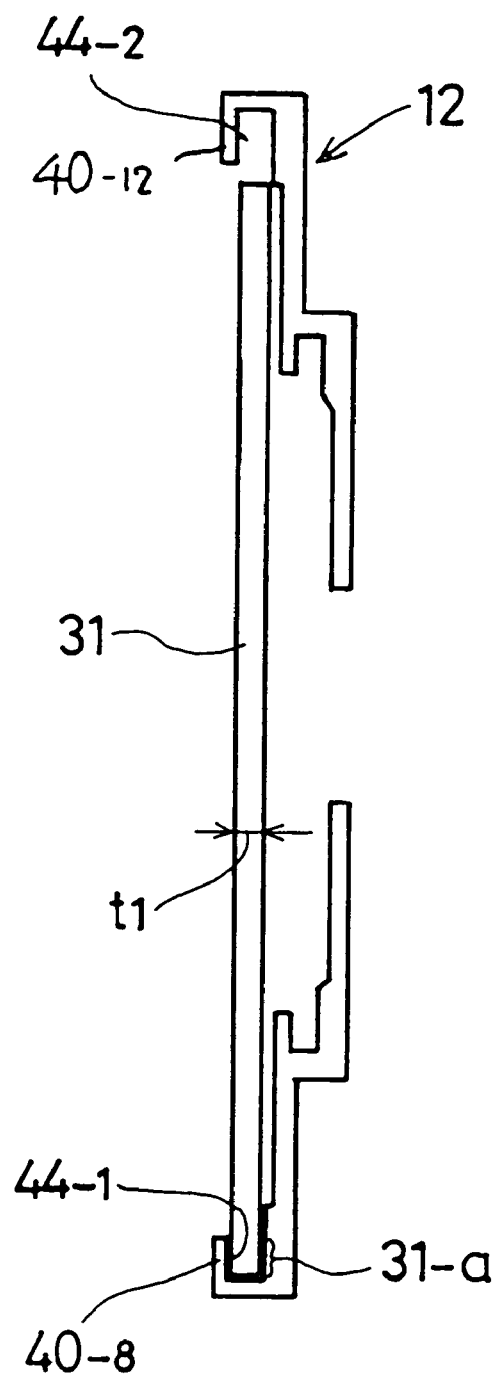
FIG. 12 is a sectional view taken in the line XII—XII of FIG. 11.

It is assumed that the 12-cm disk 31 is used (see FIGS. 11, 12 and 13).

Referring to FIG. 11, an operator lowers the 12-cm disk 31 as indicated by an arrow 60 in a substantially vertical direction. The disk 31 is lowered until a lower end part 31a is inserted into the gap $44_{-1}$ via a state indicated by a two-dot chain line in FIG. 11.

A portion of the lower end part 31a of the 12-cm disk 31 projects downward out of the notch 42. $31a_1$ indicates the portion projecting from the disk tray 12.

As shown in FIGS. 11 and 12, the 12-cm disk 31 has its lower end part 31a supported by the tongue parts $40_{-6}$, $40_{-7}$, $40_{-8}$ and $40_{-9}$ so as to be prevented from falling in a direction indicated by an arrow 61. In this way, the disk 31 is maintained on the main part $40_{-1}$ and the lower extensions $40_{-2}$ and $40_{-3}$ of the 12-cm disk mounting part 40, in a substantially upright position.

A center $O_1$ of a central hole 31b of the 12-cm disk 31 is displaced downward (in the $Z_2$) by a distance δ with respect to a center $O_{10}$ of the turntable 21.

Next, the operator pushes a loading button.

This activates the disk tray translating mechanism 24 so as to translate the disk tray 12 in the $Y_1$ direction.

The 12-cm disk 31 maintains its substantially upright position while being loaded into the disk drive main body 11 by the disk tray 12.

While the disk tray 12 is being moved from a position immediately preceding an end position to the end position, the portion $31a_{-1}$ of the 12-cm disk 31 comes to sit on the guide part 50, as shown in FIG. 13.

As a result, the disk 31 is guided by the guide part 50 and displaced in the $Z_1$ direction. The disk 31 as a whole is drawn toward the main part $40_{-1}$, that is, toward the center of the disk tray 12. In this way, an initial stage of the centering operation is completed.

Referring to FIG. 13, a chain line indicates the state of the disk 31 at this stage.

In this state, the lower end part 31a of the disk 31 projects slightly outside the extensions $40_{-2}$ and $40_{-3}$.

The disk 31 is opposite to the damper 25 in the disk drive main body 11 and supported thereby. Thus, the disk 31 is prevented from falling even without the support provided by the tongue parts $40_{-6}$–$40_{-9}$.

Subsequently, the turntable raising/lowering mechanism 23 is operated so that the turntable 21 is displaced in the $X_2$ direction and the disk 31 is clamped on the turntable 21 by the clamper 25.

During the clamping operation, the disk 31 is finally centered by the tapered centering hub 21a so as to be in a position indicated by a solid line in FIG. 13.

The disk 31 is slightly removed from the guide part 50.

The center $O_1$ of the disk 31 moves along a path including points indicated by numerals 65, 66 and 67 before it reaches the end point $O_{10}$.

In this state, the disk 31 is rotated by the motor 22 and information on the disk 31 is reproduced by the optical head 20.

In response to an ejecting operation, the mechanism as described above is activated in a reverse sequence.

Consequently, the disk 31 is ejected out of the disk drive main body 11 in a generally upright position, while being supported by the tongue parts $40_{-6}$–$40_{-9}$ of the disk tray 12.

Figure 15:
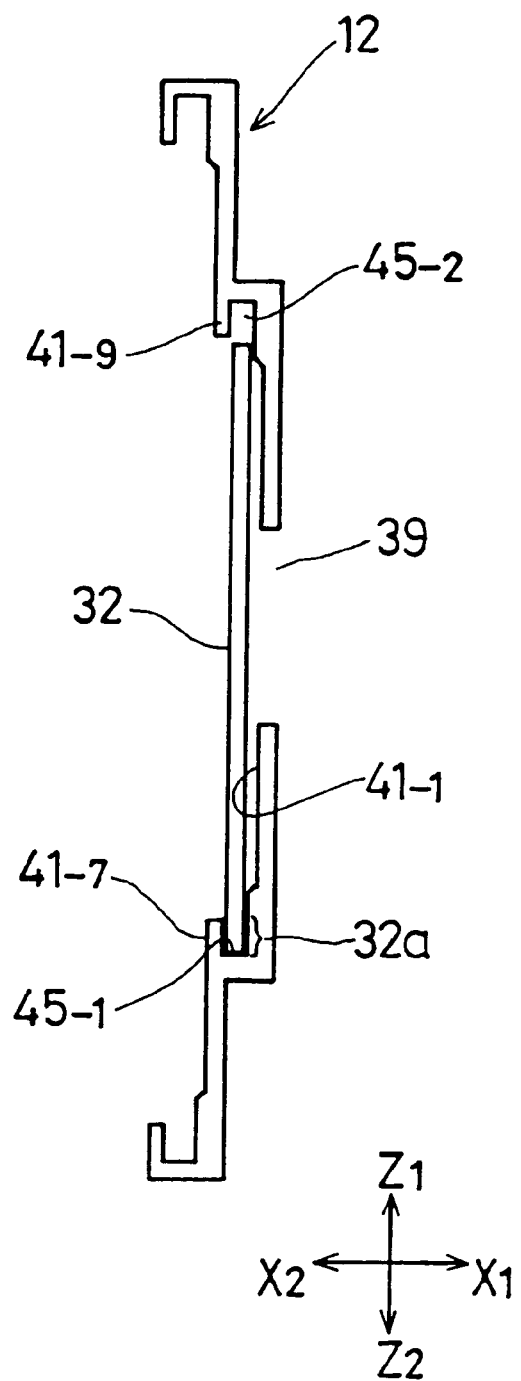
FIG. 15 is a sectional view taken in the line XV—XV of FIG. 14.
Figure 16:
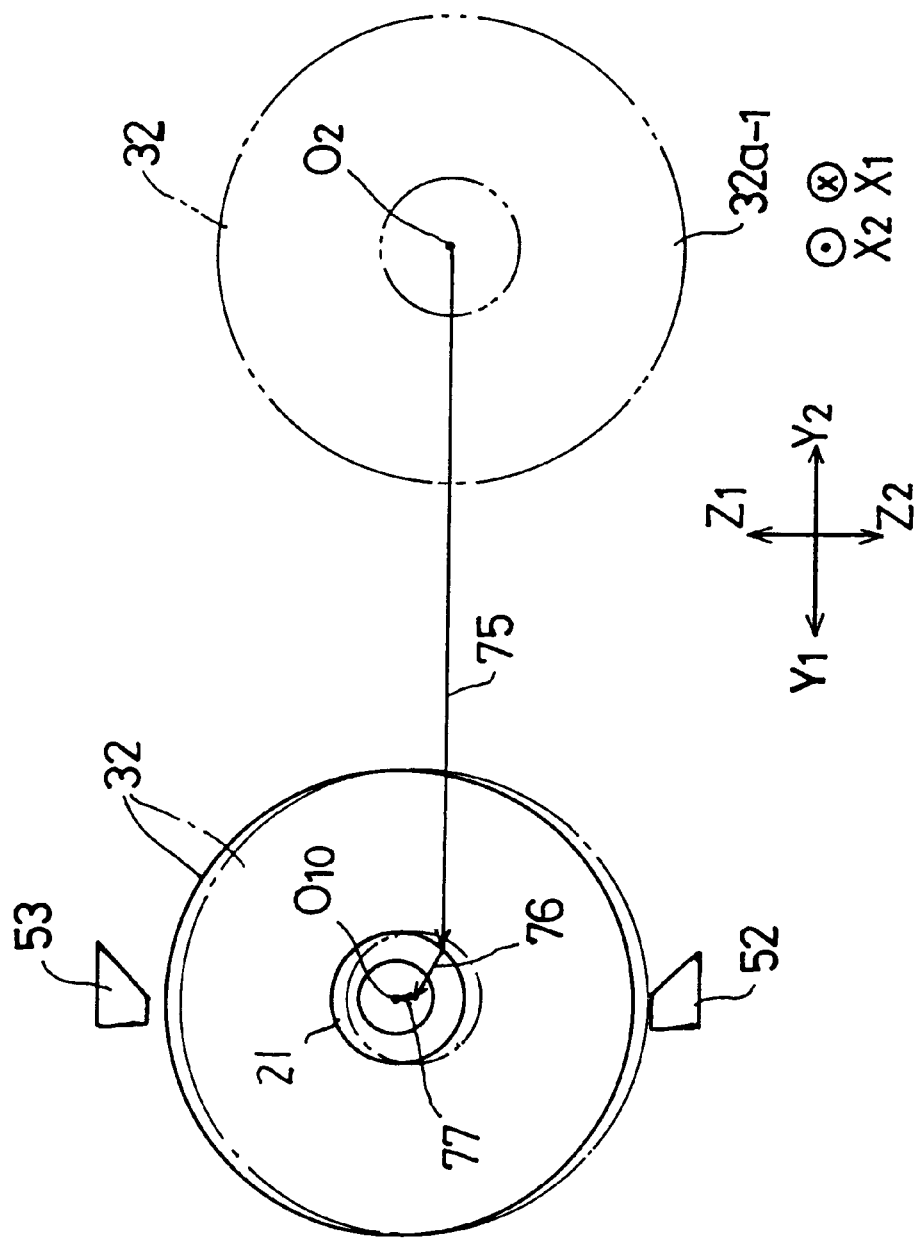
FIG. 16 shows how the disk is moved and mounted in a configuration shown in FIG. 14.

It will now be assumed that the 8-cm disk 32 is used (see FIGS. 14, 15 and 16).

Referring to FIG. 14, an operator lowers the 8-cm disk 32 as indicated by an arrow 70 in a substantially vertical direction. The disk 32 is lowered until a lower end part 32a is inserted into the gap $45_{-1}$ via a state indicated by a two-dot chain line in FIG. 14.

A portion of the lower end part 32a of the 8-cm disk 32 projects into the opening 46. $32a_{-1}$ indicates the portion projecting into the opening 46.

As shown in FIGS. 14 and 15, the 8-cm disk 32 has its lower end part 32a supported by the tongue parts $41_{-6}$ and $41_{-7}$ so as to be prevented from falling in a direction indicated by an arrow 71. In this way, the disk 32 is maintained on the main part $41_{-1}$ and the lower extensions $41_{-2}$ and $41_{-3}$ of the 8-cm disk mounting part 41, in a substantially upright position.

A center $O_1$ of a central hole 32b of the 8-cm disk 32 is displaced downward (in the $Z_2$ direction) by a distance δ with respect to a center $O_{10}$ of the turntable 21.

Next, the operator pushes a loading button.

This activates the disk tray translating mechanism 24 so as to translate the disk tray 12 in the $Y_1$ direction.

The 8-cm disk 32 maintains its substantially upright position while being loaded into the disk drive main body 11 by the disk tray 12.

The guide parts 52 and 53 relatively enter the openings 46 and 47, respectively.

While the disk tray 12 is being moved from a position immediately preceding an end position to the end position, the portion $32a_{-1}$ of the 8-cm disk 32 comes to sit on the guide part 52, as shown in FIG. 16.

As a result, the disk 32 is guided by the guide part 52 and displaced in the $Z_1$ direction. The disk 32 as a whole is drawn toward the main part $41_{-1}$, that is, toward the center of the disk tray 12. In this way, an initial stage of the centering operation is completed.

Referring to FIG. 16, a chain line indicates the state of the disk 32 at this stage.

In this state, the lower end part 32a of the disk 32 projects slightly outside the extensions $41_{-2}$ and $41_{-3}$.

The disk 32 is opposite to the clamper 25 in the disk drive main body 11 and supported thereby. Thus, the disk 32 is prevented from falling even without the support provided by the tongue parts $41_{-6}$ and $41_{-7}$.

Subsequently, the turntable raising/lowering mechanism 23 is operated so that the turntable 21 is displaced in the $X_2$ direction and the disk 32 is clamped on the turntable 21 by the clamper 25.

During the clamping operation, the disk 32 is finally centered by the tapered centering hub 21a so as to be in a position indicated by a solid line in FIG. 16.

The disk 32 is slightly removed from the guide part 53.

The center $O_1$ of the disk 32 moves along a path including points indicated by numerals 75, 76 and 77 before it reaches the end point $O_{10}$.

In this state, the disk 32 is rotated by the motor 22 and information on the disk 32 is reproduced by the optical head 20.

In response to an ejecting operation, the mechanism as described above is activated in a reverse sequence.

Consequently, the disk 32 is ejected out of the disk drive main body 11 in a generally upright position, while being supported by the tongue parts $41_{-6}$ and $41_{-7}$ of the disk tray 12.

Another case is considered where a disk mounting parts 40 and 41 face the opposite direction, that is, the orientation of the disk is 180° reversed with respect to the orientation shown in FIG. 11.

Figure 17:
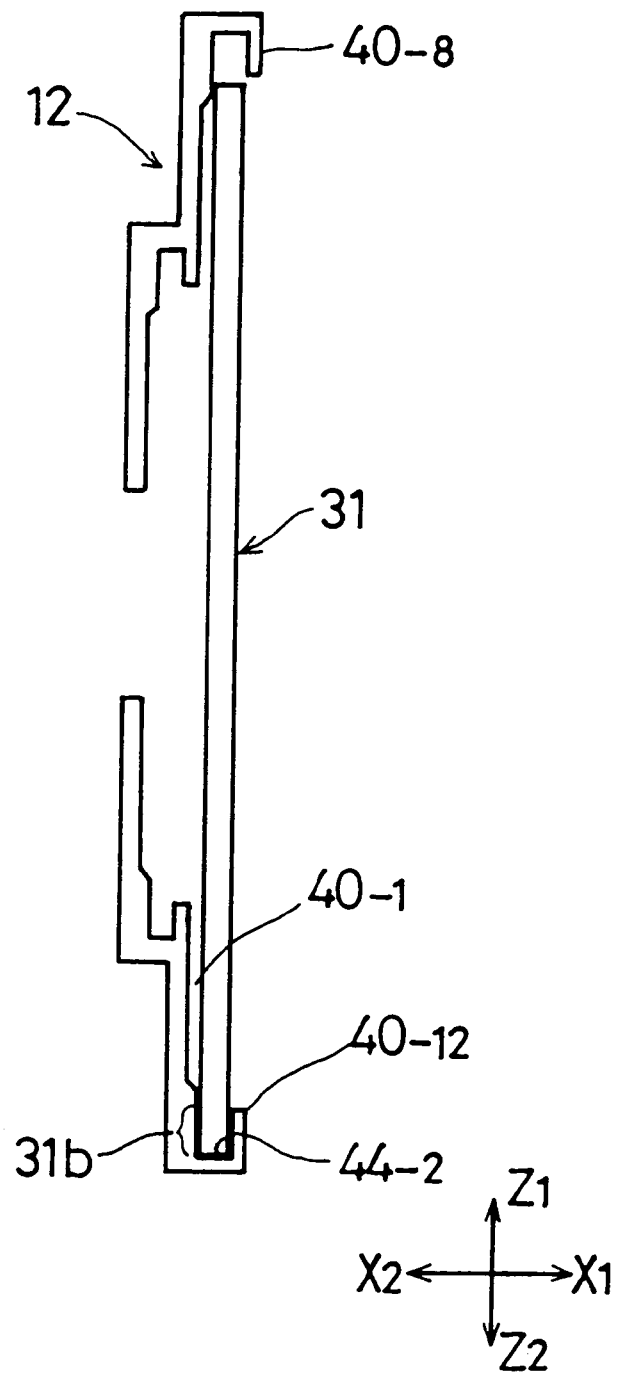
FIG. 17 shows how a 12-cm disk is set in a disk tray when the disk drive is used in a 180° reverse orientation with respect to the orientation shown in FIG. 11.
Figure 18:
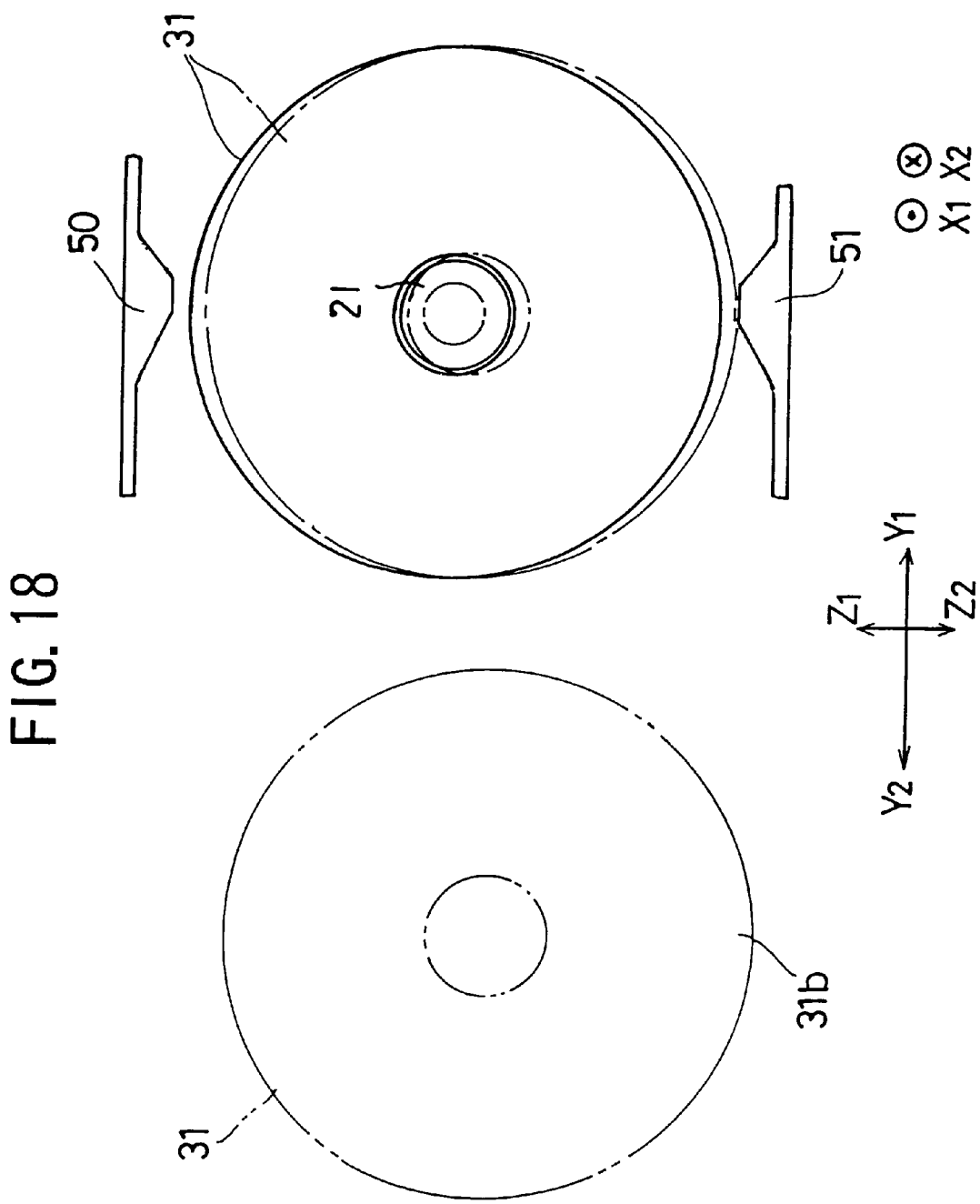
FIG. 18 shows how the disk is moved and mounted in a configuration shown in FIG. 17.

It is assumed that the 12-cm disk 31 is used (see FIGS. 17 and 18).

As shown in FIG. 17, the disk 31 has its lower end part 31b inserted into the gap $44_{-2}$ and supported in an upright position by the tongue parts $40_{-10}$ and $40_{-13}$.

The disk 31 is moved as shown in FIG. 18. That is, the disk 31 is drawn to the main part $40_{-1}$ by the guide part 51 and centered by the centering hub 21a. Thus, the disk 31 is properly mounted.

Figure 19:
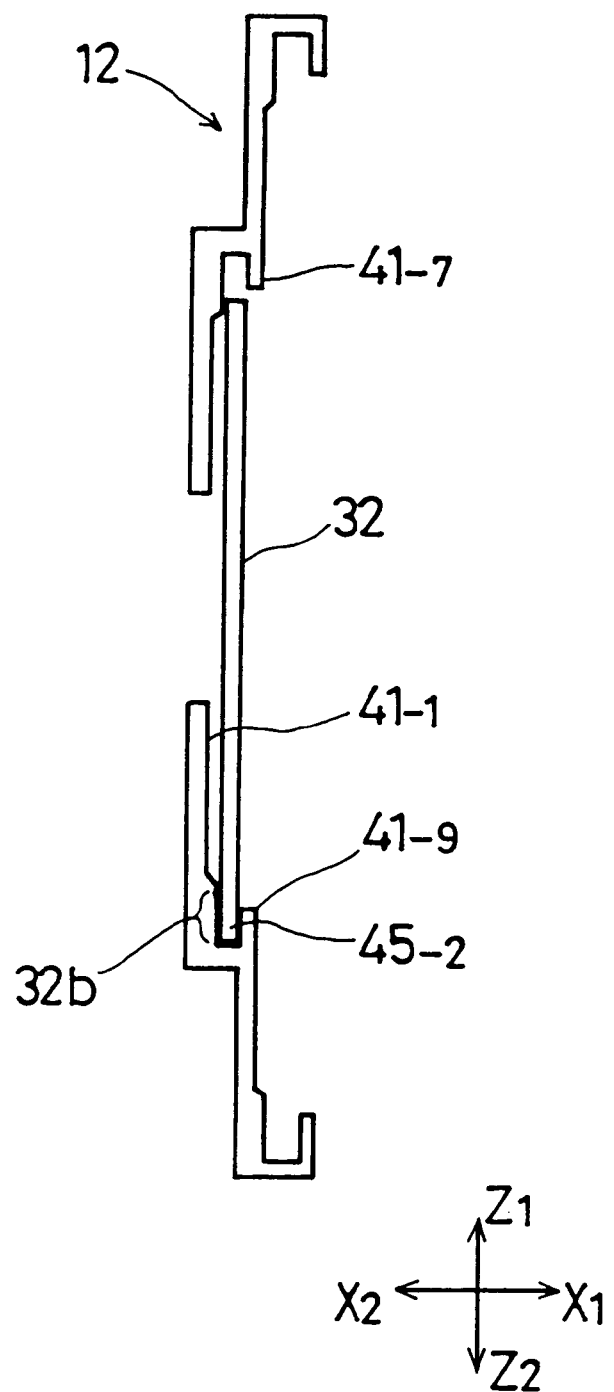
FIG. 19 shows how an 8-cm disk is set in a disk tray when the disk drive is used in a 180° reverse orientation with respect to the orientation shown in FIG. 14.

It is then assumed that the 8-cm disk 32 is used (see FIGS. 19 and 20).

The disk 32 has its lower end part 32b inserted into the gap $45_{-2}$ and supported in an upright position by the tongue parts $41_{-10}$–$41_{-13}$.

The disk 32 is moved as shown in FIG. 20. That is, the disk 32 is drawn to the main part $41_{-1}$ by the guide part 52 and centered by the centering hub 21a. Thus, the disk 32 is properly mounted.

In a variation of the above-described embodiments, the gaps $44_{-1}$ and $44_{-2}$ have a greater dimension a, and the gaps $45_{-1}$ and $45_{-2}$ have a greater dimension b. In this variation, too, the disk can be supported in a substantially upright position and can be rotated properly while being inserted into the gaps. This means that the present invention includes variations of the above-described embodiments wherein the guide parts 50–53 are not provided.

The present invention can be applied not only to an optical disk drive but to a magneto-optic disk drive or a magnetic disk drive.

The present invention is not limited to the above described embodiments, and variations and modifications may be made without departing from the scope of the present invention.

What is claimed is:

1. A disk drive comprising:

a disk drive main body provided with a turntable and a head; and a disk tray provided with a disk mounting part on which a disk is mounted, and configured to be ejectable with respect to the disk drive main body, said disk tray introducing the disk mounted on said disk mounting part into the disk drive main body;

the disk mounting part of said disk tray comprising:

a main part having a dimension compatible with the disk, and enabling mounting of the disk in a level position when said disk drive is used in a level position;

generally crescent shaped extensions produced by extending partially said main part in a radial direction and near corners of the disk tray so as to form corner ear spaces, and said extensions accommodating a portion of said disk mounted on the disk tray only when the disk drive is used in an upright position, said extensions being integral with the main part and formed of the same solid material as the main part; and fixed tongue parts each extending with a vertical separation from the circumference of each of the crescent shaped extensions and formed as eaves hanging over only the extensions such that peripheral edges of said tongue parts define a circle of a diameter which is compatible with that of the disk accommodated in said main part, whereby the tongue parts support said portion of said disk only when the disk drive is in the upright position and the disk is accommodated in the extensions so that said disk mounted on the disk tray in an upright position is prevented from falling, the positions of said main part, said tongue parts and extensions being fixed with respect to the disk tray throughout entire disk-mounting and disk-ejection operations.

2. A disk drive comprising:

a disk drive main body provided with a turntable and a head; and a disk tray provided with a disk mounting part on which a disk is mounted, and configured to be ejectable with respect to the disk drive main body, said disk tray introducing the disk mounted on said disk mounting part into the disk drive main body;

the disk mounting part of said disk tray comprising:

a main part having a dimension compatible with the disk, and enabling mounting of the disk in a level position when said disk drive is used in a level position;

generally crescent shaped extensions produced by extending partially said main part in a radial direction and near corners of the disk tray so as to form corner ear spaces, and said extensions accommodating a portion of said disk mounted on the disk tray only when the disk drive is used in an upright position, said extensions being integral with the main part and formed of the same solid material as the main part; and fixed tongue parts each extending with a vertical separation from the circumference of each of the crescent shaped extensions and formed as eaves hanging over only the extensions such that peripheral edges of said tongue parts define a circle of a diameter which is compatible with that of the disk accommodated in said main part, whereby the tongue parts support said portion of said disk only when the disk drive is in the upright position and the disk is accommodated in the extensions so that said disk mounted on the disk tray in an upright position is prevented from falling;

said disk drive main body being provided with, at respective portions facing said disk tray, fixed guide parts for guiding said disk mounted on said disk mounting part in an upright position so as to draw said disk toward said main part of said disk mounting part, when said disk is introduced into said disk drive main body, and the positions of said main part, said tongue parts and extensions being fixed with respect to the disk tray throughout entire disk-mounting and disk-ejection operations.

3. The disk drive according to claim 2, wherein the fixed guide parts are provided on side walls of a chassis, included in the disk drive main body, said guide parts projecting toward the turntable and being integrally formed with the chassis.

4. A disk drive comprising:

a disk drive main body provided with a turntable and a head; and a disk tray provided with a large-diameter disk mounting part on which a large-diameter disk is mounted and a small-diameter disk mounting part on which a small-diameter disk is mounted, the large-diameter disk mounting part and the small-diameter disk mounting part being concentric with the large-diameter disk mounting part on top of the small-diameter disk mounting part, and configured to be ejectable with respect to the disk drive main body, said disk tray introducing the disk mounted on one of said disk mounting parts into the disk drive main body;

each of the disk mounting parts of said disk tray comprising:

a main part having a dimension compatible with the disk, and enabling mounting of the disk in a level position when said disk drive is used in a level position;

generally crescent shaped extensions produced by extending partially said main part in a radial direction and near corners of the disk tray so as to form corner ear spaces, and said extensions accommodating a portion of said disk mounted on the disk tray only when the disk drive is used in an upright position, said extensions being integral with the main part and formed of the same solid material as the main part; and fixed tongue parts each extending with a vertical separation from the circumference of each of the crescent shaped extensions and formed as eaves hanging over only the extensions such that peripheral edges of said tongue parts define a circle of a diameter which is compatible with that of the disk accommodated in said main part, whereby the tongue parts support said portion of said disk only when the disk drive is in the upright position and the disk is accommodated in the extensions so that said disk mounted on the disk tray in an upright position is prevented from falling, the positions of said main part, said tongue parts and extensions being fixed with respect to the disk tray throughout entire disk-mounting and disk-ejection operations.

5. A disk drive comprising:

a disk drive main body provided with a turntable and a head; and a disk tray provided with a large-diameter disk mounting part on which a large-diameter disk is mounted and a small-diameter disk mounting part on which a small-diameter disk is mounted, the large-diameter disk mounting part and the small-diameter disk mounting part being concentric with the large-diameter disk mounting part on top of the small-diameter disk mounting part, and configured to be ejectable with respect to the disk drive main body, said disk tray introducing the disk mounted on one of said disk mounting parts into the disk drive main body;

each of the disk mounting parts of said disk tray comprising:

a main part having a dimension compatible with the disk, and enabling mounting of the disk in a level position when said disk drive is used in a level position;

generally crescent shaped extensions produced by extending partially said main part in a radial direction and near corners of the disk tray so as to form corner ear spaces, and said extensions accommodating a portion of said disk mounted on the disk tray only when the disk drive is used in an upright position, said extensions being integral with the main part and formed of the same solid material as the main part; and fixed tongue parts each extending with a vertical separation from the circumference of each of the extensions and formed as eaves hanging over only the extensions such that peripheral edges of said tongue parts define a circle of a diameter which is compatible with that of the disk accommodated in said main part, whereby the tongue parts support said portion of said disk only when the disk drive is in the upright position and the disk is accommodated in the extensions so that said disk mounted on the disk tray in an upright position is prevented from falling;

said disk main body being provided with, at respective portions facing said disk tray, fixed guide parts for guiding said disk mounted on one of said disk mounting parts in an upright position so as to draw said disk toward said main part of said disk mounting part, when said disk is introduced into said disk drive main body, and the positions of said main part, said tongue parts and extensions being fixed with respect to the disk tray throughout entire disk-mounting and disk-ejection operations.

6. The disk drive according to claim 5, wherein the fixed guide parts are provided on side walls of a chassis, included in the disk drive main body, and on a bottom plate of the chassis, said guide parts projecting toward the turntable and being integrally formed with the chassis.

* * * * *